United States Patent [19]

Long et al.

[11] Patent Number: 4,512,875

[45] Date of Patent: Apr. 23, 1985

[54] CRACKING OF CRUDE OILS WITH CARBON-HYDROGEN FRAGMENTATION COMPOUNDS OVER NON-ZEOLITIC CATALYSTS

[75] Inventors: Gary N. Long, Putnam Valley; Regis J. Pellet, Croton-On-Hudson; Jule A. Rabo, Armonk, all of N.Y.

[73] Assignee: Union Carbide Corporation, Danbury, Conn.

[21] Appl. No.: 490,952

[22] Filed: May 2, 1983

[51] Int. Cl.$^3$ .............................................. C10G 11/04
[52] U.S. Cl. .................................................... 208/114
[58] Field of Search ........................ 423/305; 208/114

[56] References Cited

U.S. PATENT DOCUMENTS

| | | | |
|---|---|---|---|
| 2,270,044 | 1/1942 | Fulton et al. | 208/114 |
| 2,865,842 | 12/1958 | Hirschler et al. | 208/114 |
| 3,974,062 | 8/1976 | Owen et al. | 208/251 R |
| 4,002,557 | 1/1977 | Owen et al. | 208/251 R |
| 4,035,285 | 7/1977 | Owen et al. | 208/56 X |
| 4,158,621 | 6/1979 | Swift et al. | 208/114 |
| 4,340,465 | 7/1982 | Miller et al. | 208/120 |

*Primary Examiner*—Delbert E. Gantz
*Assistant Examiner*—Lance Johnson
*Attorney, Agent, or Firm*—Gary L. Warner

[57] ABSTRACT

The process for increasing the production of petrochemical conversion processes in the presence of a carbon-hydrogen fragmentation compound in the presence of a non-zeolitic molecular sieve.

14 Claims, 3 Drawing Figures

4,512,875

CRACKING OF CRUDE OILS WITH CARBON-HYDROGEN FRAGMENTATION COMPOUNDS OVER NON-ZEOLITIC CATALYSTS

FIELD OF THE INVENTION

The instant process relates to a new process for increasing the net production of petrochemical conversion processes by employing carbon-hydrogen fragmentation compounds in the presence of a catalyst comprising a non-zeolitic molecular sieve component.

BACKGROUND OF THE INVENTION

There is a continuing demand for refinery products, including gasoline, distillates (e.g., diesel and jet fuels) and gaseous fuels. Because of this ongoing need for petroleum products, petroleum refiners are often forced to work with heavier, often hydrogen deficient, and high impurity feeds or simply wish to maximize the saleable products from the raw materials. Also, there is a growing pressure to utilize every fraction of the crude oil including light refinery gases and resids, in the effort to optimize liquid fuel production.

The present process relates to processing whole crude in which a carbon-hydrogen fragmentation compound(s) and a crude are mixed with one another and reacted by contact with a non-zeolitic catalyst (as herein defined) and, optionally, with a zeolitic cracking catalyst. The cracking operation may occur in the presence of a hydrogen activating function or other catalytic components.

SUMMARY OF THE INVENTION

Figure 1:
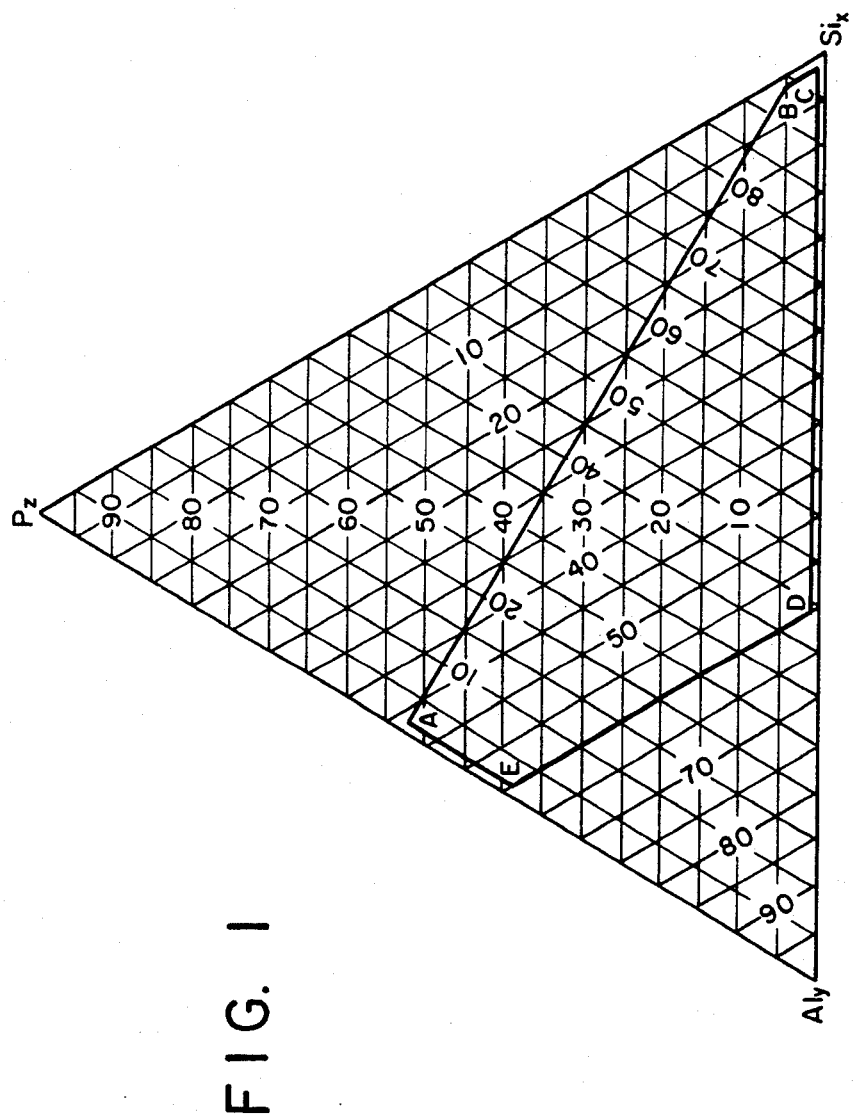
FIG. 1 is a ternary diagram showing the compositional parameters of the silicoaluminophosphates of this invention in terms of mole fractions of silicon, aluminum and phosphorous.

The instant process relates to a process for converting a crude oil, as hereinafter defined, e.g. crude oil, syncrudes, shale and tar sands, and the like, and generally comprises:

(a) combining the crude oil with between 1 weight percent and 25 weight percent, based on total feed weight of a carbon-hydrogen fragmentation compound(s) (as hereinafter defined); and (b) contacting the combined product of step (a) with a catalyst containing a non-zeolitic molecular sieve catalyst (as hereinafter defined) at effective conversion conditions.

Zeolitic cracking catalysts may be employed with the non-zeolitic molecular sieve when desired.

DETAILED DESCRIPTION OF THE INVENTION

The present invention is concerned with providing carbon-hydrogen fragments in a hydrocarbon conversion operation by use of a non-zeolitic molecular sieve which acts as an activation catalyst for carbon-hydrogen fragmentation compounds whereby such carbon-hydrogen fragments are provided in such amounts that the yield of desired hydrocarbon product will be simultaneously increased. The present invention is concerned with providing to a catalytic cracking operation carbon-hydrogen fragmentation compounds which are lower boiling than the high molecular weight hydrocarbons, i.e., crude charged. The present invention provides such a hydrocarbon conversion process with one or more non-zeolitic molecular sieves and, optionally, a zeolitic cracking material, wherein said non-zeolitic material will promote chemical reactions with the carbon-hydrogen fragmentation compounds, and by such process promote the catalytic cracking process to provide useful products by contributing such carbon-hydrogen fragments, e.g. $CH_x$ (X is 1, 2 or 3), to the hydrocarbon fuel products boiling in a lower range than the crude oil feed.

The present invention employs a carbon-hydrogen fragmentation compound and a crude oil which are intimately mixed with one another and reacted with a catalyst containing a non-zeolitic molecular sieve component and, optionally, a zeolitic cracking component. The process provides carbon-hydrogen fragment addition reactions, e.g. methylation, occurs to produce desired products. The carbon-hydrogen fragment addition reactions occur in the presence of the non-zeolitic catalyst at effective process conditions.

A particular advantage of the present invention process is that it can be carried out at low pressures (i.e. at pressures commonly employed in current catalytic cracking operations or slightly higher.) It is most preferred that the reactions be performed in fluidized catalyst systems (risers, dense beds, etc.), but they can also be practiced in some fixed catalyst bed arrangements or moving bed catalytic systems. The reactions described herein may occur in one stage of operation all at the same process conditions, or in a sequence of two or more stages of operation, at the same or different process conditions. Further, the catalyst functions referred to herein may be on the same catalyst particle, or on different catalyst particles such as on the crystalline zeolite non-zeolitic molecular sieve, or a mixture thereof.

Specific advantages of the present process include the conversion of heavy crude feedstocks to lower boiling hydrocarbon fuels with improved gasoline yield and/or gasoline quality (including octane and volatility) with a high yield of fuel oil fractions. The need for costly high pressure hydrocrackers using expensive molecular hydrogen rich gas can be eliminated, and/or the severity of the operation greatly decreased, thus saving considerable capital investment and operating costs.

The term "carbon-hydrogen fragmentation compound(s)" is employed herein to mean materials comprising a lesser number of carbon atoms than found in materials within the gasoline boiling range, preferably those materials containing 5 or less carbon atoms, that fit into any of the categories of:

(a) i.e. a molecule whose chemical structure permits or favors the transfer of carbon-hydrogen fragments. This includes $CH_3OH$, other low boiling alcohols such as ethanol, n-propanol, isopropanol, n-butanol, isobutanol, etc., aliphatic ethers, e.g., dimethyl ether, and other oxygen compounds (acetals, aldehydes, ketones).

(b) Hydrogen-rich molecules, i.e. molecules with wt. % hydrogen ranging from about 13.0-25.0 wt. %. This may include light paraffins, i.e. $CH_4$, $C_2H_6$, $C_3H_8$ and other materials.

(c) Secondary Reaction Products from materials in categories (a) or (b) above that are carbon-hydrogen fragmentation compounds themselves, or transfer hydrogen. This includes olefins, napthenes, or paraffins.

(d) Classes of materials which are structurally or chemically equivalent to those of category (c), notably olefins, etc.; and (e) A combination of any or all of the materials in categories (a) through (d) in an effective amount wherein each material may be present in an amount between about 1% and about 99% by weight based on the total weight of the combined materials of categories (a) through (d) can provide the carbon-hydrogen fragmentation compounds employed in the instant process.

The carbon-hydrogen fragmentation compound is generally employed in an amount between about 1 and about 25 percent by weight and preferably between about 5 and about 20 percent by weight based on the total feed weight, although amounts in excess of 25 percent by weight may be employed depending on the crude oil feed, selective non-zeolitic molecular sieve and the effective process conditions.

The preferred carbon-hydrogen fragmentation compounds are methanol, dimethyl ether and $C_2$–$C_5$ olefins, with methanol and dimethyl ether and mixtures thereof being the most preferred.

One particularly surprising aspect of this invention is the ability of the non-zeolitic composition(s) to generate carbon-hydrogen fragmentation compounds in situ from the initial carbon-hydrogen fragmentation compound, e.g., methanol, and, further, the relative selectivity of the non-zeolitic component(s) for conversion of the carbon-hydrogen fragmentation compound over the crude oil feed.

The terms "crude oil feed" is used herein to denominate any full range crude oil from primary, secondary or tertiary recovery from conventional or offshore oil fields. "Crude oil feeds" may include any full range "syncrude" such as those that can be derived from coal, shale oil, tar sands and bitumens. The crude may be virgin (straight run) or generated synthetically by blending. It is generally desirable, however, to first desalt the crude since sodium chloride is known to be a poison for most cracking operations. Further the term crude oil feed is meant to include component parts of the crude which are generally employed as catalytic cracking feeds or potential feeds therefore and include feeds such as distillate gas oils, heavy vacuum gas oils, atmospheric and vacuum resids, syncrudes (from shale oil, tar sands, coal), pulverized coal and fractions boiling above the traditional end of the gasoline boiling range which generally includes compounds containing greater than about eleven carbon atoms and combinations thereof.

When a zeolitic catalyst is employed herein, it may be an acidic composition. When such a zeolitic component is employed herein, it is generally intimately dispersed in a matrix with the non-zeolitic molecular sieve.

The catalyst may contain additional "hydrogen-activating function", i.e., may aid in the redistribution of carbon-hydrogen fragments or may also aid in the transfer of hydrogen, hydrogen dissociation and/or hydrogen activation. The non-zeolitic component may have one or more metal functions if the process is carried out without significant amounts of hydrogen being present.

The term "hydrogen transfer" is generally employed herein consistent with its common meaning to characterize the ability to transfer hydrogen from one type of hydrocarbon to another with a catalyst particularly promoting the transfer. This type of chemical reaction is to be contrasted with hydrogenation catalysts or catalyst components capable of attaching hydrogen to an olefin from gaseous molecular hydrogen.

The term "non-zeolitic" is used herein to denominate molecular sieves which are not formed of an essential framework of only aluminum and silicon tetrahedra such as the essential framework present in ZSM-type zeolites, zeolites Y and X and the like.

Representative of non-zeolitic molecular sieves employable herein are generally referred to as crystalline metallophosphate ($AlPO_4$) compositions, silicoaluminophsophate compositions, silicalite, and other non-zeolitic molecular sieves having similar structures.

Representative of the non-zeolitic molecular sieves employable herein are those described as $AlPO_4$type molecular sieves in U.S. Pat. No. 4,310,440, incorporated herein by reference thereto, silicalite (U.S. Pat. No. 4,061,724, incorporated herein by reference thereto) and as SAPO molecular sieves, as described in U.S. Ser. No. 400,438, filed July 26, 1982, now U.S. Pat. No. 4,440,871 incorporated herein by reference thereto.

The $AlPO_4$ molecular sieves of U.S. Pat. No. 4,310,440 are generally described as being crystalline aluminophosphates having a framework structure whose chemical composition expressed in terms of mole ratios of oxides is

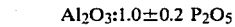

$Al_2O_3$:1.0±0.2 $P_2O_5$ each of said framework structures being microporous in which the pores are uniform and have nominal diameters within the range of about 3 to about 10 Angstroms, an intracrystalline adsorption capacity for water at 4.6 torr and 24° C. of at least 3.5 weight percent, the adsorption and desorption of water being completely reversible while retaining the same essential framework topology in both the hydrated and dehydrated state.

SA PO-type molecular sieves employable in the instant process are generally referred to as silicoaluminophosphate molecular sieves and comprise a molecular framework of [$AlO_2$], [$PO_2$] and [$SiO_2$] tetrahedral units. It should be noted that the [$AlO_2$] tetrahedral unit has a net negative charge and the [$PO_2$] tetrahedral unit has a net positive charge, although such has not been designated herein as such.

The preferred silicoaluminophosphate molecular sieves employed in the instant process and as described in U.S. Pat. No. 4,440,871 incorporated herein by reference thereto, will be referred to hereinafter, solely for point of reference herein, as "SAPO" molecular sieves, or as "SAPOs" if the reference is to the class as a whole as employed herein. This designation is simply made for the sake of convenient reference herein and is not meant to designate a particular structure for any given silicoaluminophosphate (SAPO) molecular sieve and consistent with the designation in U.S. Ser. No. 400,438. The members of the class of SAPO's will be characterized simply by referring to such members as SAPO-5, SAPO-11, etc, i.e., a particular species will be referred to as SAPO-n where "n" is a number specific to a given class member as its preparation is reported herein. This designation is an arbitrary one and is not intended to denote structure or relationship to another material(s) which may also be characterized by a numbering system.

The preferred silicoaluminophosphate molecular sieves (SAPOs) suitable for use in the instant process comprise any molecular sieve having a silicoaluminophosphate molecular framework which comprises a molecular framework of corner-sharing [SiO$_2$] tetrahedra, [AlO$_2$] tetrahedra and [PO$_2$] tetrahedra, (i.e., (Si$_x$Al$_y$P$_z$)O$_2$ tetrahedral units).

Such SAPO's are characterized as comprising a three-dimensional microporous crystal framework structure of [SiO$_2$], [AlO$_2$] and [PO$_2$] tetrahedral units which has a unit empirical formula on an anhydrous basis of:

$$mR:(Si_xAl_yP_z)O_2 \qquad (1)$$

wherein "R" represents at least one organic templating agent (hereinafter also referred to as "template") present in the intracrystalline pore system; "m" represents the moles of "R" present per mole of (Si$_x$Al$_y$P$_z$)O$_2$ and has a value from zero (0) to about 0.3, with the maximum value of m being related, at least in part, to the molecular dimensions of the template and the void volume of the intracrystalline pore system of the particular SAPO; "x", "y" and "z" represent the mole fractions of silicon, aluminum and phosphorus, respectively, present as tetrahedral oxide units, said mole fractions being within the pentagonal compositional area defined by points A, B, C, D and E of the ternary compositional diagram depicted by FIG. 1 of the drawings where the points A, B, C, D and E are represented by the following values for "x", "y" and "z":

| Point | Mole Fraction | | |
|-------|------|------|------|
|       | x    | y    | z    |
| A     | 0.01 | 0.47 | 0.52 |
| B     | 0.94 | 0.01 | 0.05 |
| C     | 0.98 | 0.01 | 0.01 |
| D     | 0.39 | 0.60 | 0.01 |
| E     | 0.01 | 0.60 | 0.39 |

Figure 2:
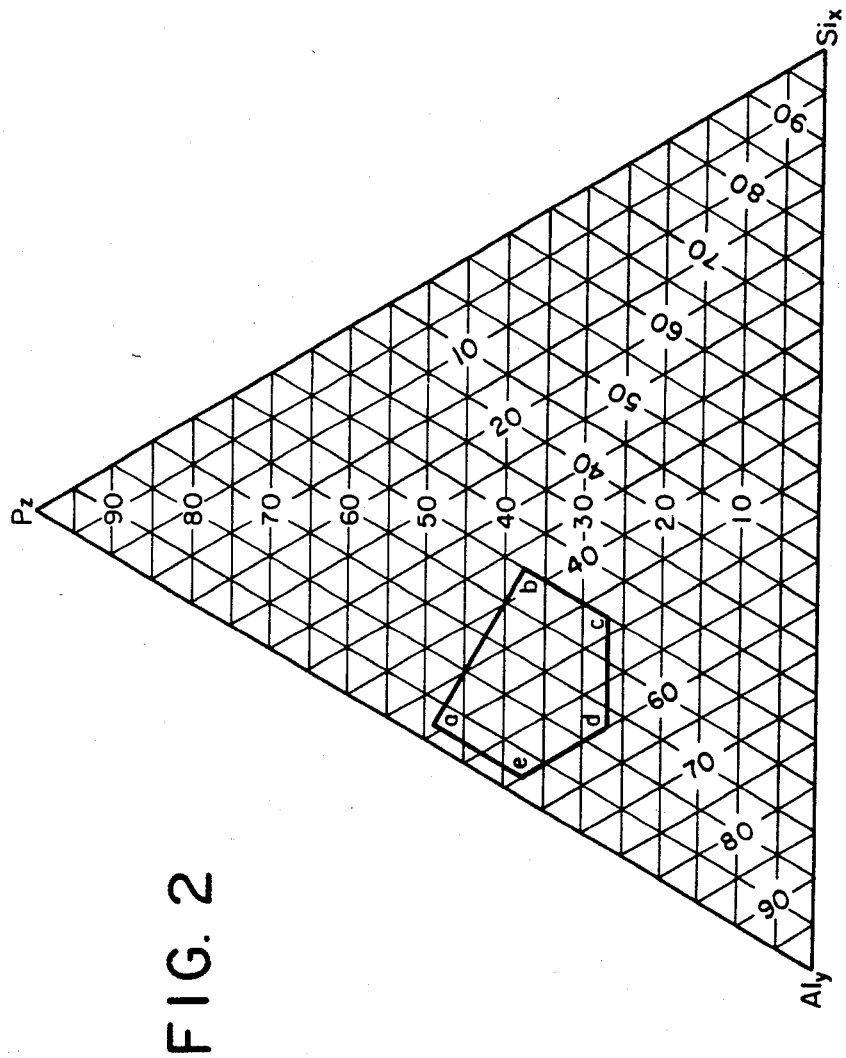
FIG. 2 is a ternary diagram showing the preferred compositional parameters of the silicoaluminophosphates of this invention in terms of mole fractions of silicon, aluminum and phosphorous.
Figure 3:
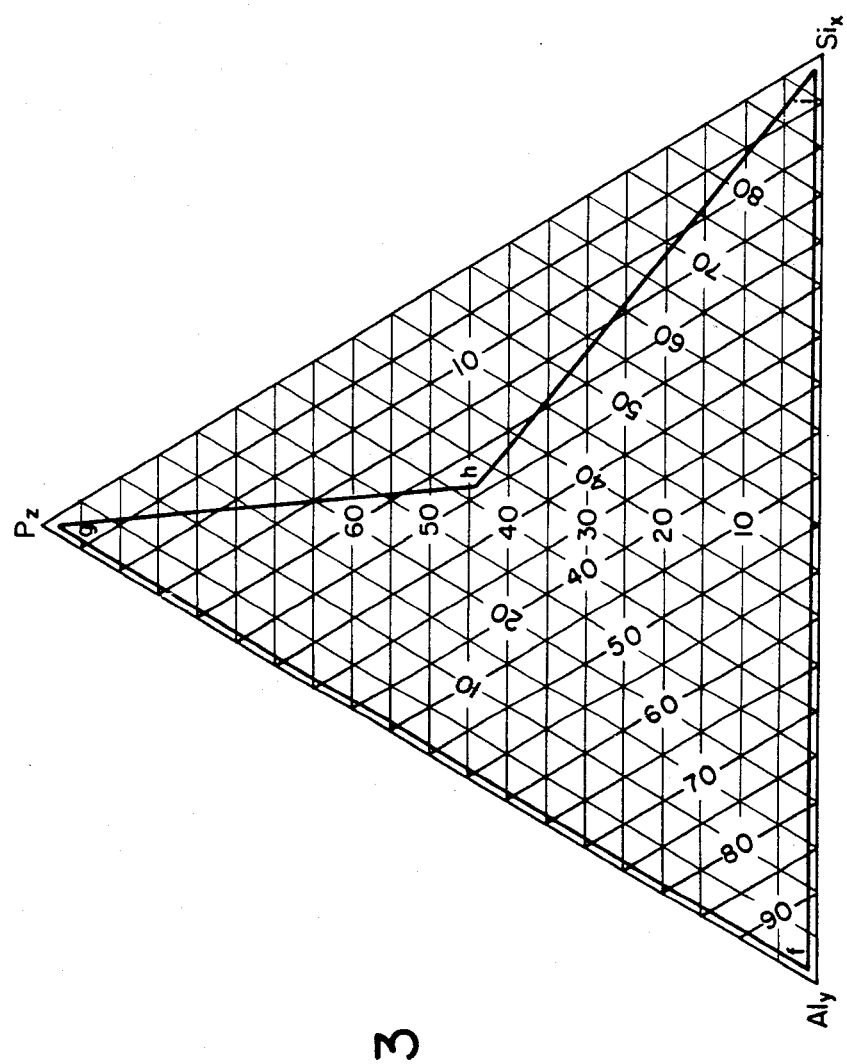
FIG. 3 is a ternary diagram showing the compositional parameters of the reaction mixtures used to prepare the silicoaluminophosphates of this invention in terms of mole fractions of silicon, aluminum and phosphorous.

A preferred sub-class of the SAPOs of Formula (1), above, have a minimum value for "m" of 0.02 in the as-synthesized form and have values for "x", "y" and "z" within the pentagonal compositional area defined by the points a, b, c, d and e of the ternary diagram which is FIG. 2 of the drawings, wherein said points a, b, c, d and e are represented by the following values for "x", "y" and "z":

| Point | Mole Fraction | | |
|-------|------|------|------|
|       | x    | y    | z    |
| a     | 0.02 | 0.49 | 0.49 |
| b     | 0.25 | 0.37 | 0.38 |
| c     | 0.25 | 0.48 | 0.27 |
| d     | 0.13 | 0.60 | 0.27 |
| e     | 0.02 | 0.60 | 0.38 |

The term "unit empirical formula" is used herein according to its common meaning to designate the simplest formula which gives the relative number of atoms of silicon, aluminum and phosphorus which form a [PO$_2$], [AlO$_2$] and [SiO$_2$] tetrahedral unit within a silicoaluminophosphate molecular sieve and which forms the molecular framework of the SAPO composition(s). The unit empirical formula is given in terms of silicon, aluminum and phosphorus as shown in Formula (1), above, and does not include other compounds, cations or anions which may be present as a result of the SAPO's preparation or the existence of other impurities or materials in the bulk composition not containing the aforementioned tetrahedral unit as the molecular framework. The amount of template R is reported as part of the composition when the as-synthesized unit empirical formula is given, and water may also be reported unless such is defined as the anhydrous form. For convenience, coefficient "m" for template "R" is reported as a value that is normalized by dividing the number of moles of R by the total number of moles of silicon, phosphorus and aluminum. When moles of water are reported the moles of water relative to the mole fractions of silicon, aluminum and phosphorus is reported as a value that is normalized by dividing the number of moles of water by the total moles of silicon, phosphorus and aluminum. The values for x, y and z are determined by dividing the number of moles of silicon, aluminum, and phosphorus individually by the total number of moles of silicon, aluminum and phosphorus.

The unit empirical formula for a SAPO may be given on an "as-synthesized" basis or may be given after an "as-synthesized" SAPO composition has been subjected to some post treatment process, e.g., calcined. The term "as-synthesized" herein shall be used to refer to the SAPO composition(s) formed as a result of the hydrothermal crystallization but before the SAPO composition has been subjected to post treatment to remove any volatile components present therein. The actual value of "m" for a post-treated SAPO will depend on several factors (including: the particular SAPO, template, severity of the post-treatment in terms of its ability to remove the template from the SAPO, the proposed application of the SAPO composition, and etc.) and the value for "m" can be within the range of values as defined for the as-synthesized SAPO compositions although such is generally less than the as-synthesized SAPO unless such post-treatment process adds template to the SAPO so treated. A SAPO composition which is in the calcined or other post-treated form generally has an empirical formula represented by Formula (1), except that the value of "m" is generally less than about 0.02. Under sufficiently severe post-treatment conditions, e.g. roasting in air at high temperature for long periods (over 1 hr.), the value of "m" may be zero (0) or, in any event, the template, R, is undetectable by normal analytical procedures.

The above silicoaluminophosphates are generally synthesized by hydrothermal crystallization from a reaction mixture comprising reactive sources of silicon, aluminum and phosphorus, and one or more organic templating agents. Optionally, alkali metal(s) may be present in the reaction mixture. The reaction mixture is placed in a sealed pressure vessel, preferably lined with an inert plastic material, such as polytetrafluoroethylene, and heated, preferably under autogenous pressure at a temperature of at least about 100° C., and preferably between 100° C. and 250° C., until crystals of the silicoaluminophosphate product are obtained, usually for a period of from 2 hours to 2 weeks. While not essential to the synthesis of SAPO compositions, it has been found that in general stirring or other moderate agitation of the reaction mixture and/or seeding the reaction mixture with seed crystals of either the SAPO to be produced, or a topologically similar composition, facilitates the crystallization procedure. The product is recovered by any convenient method such as centrifugation or filtration.

After crystallization the SAPO may be isolated and washed with water and dried in air. As a result of the hydrothermal crystallization, the as-synthesized SAPO contains within its intracrystalline pore system at least one form of the template employed in its formation. Generally, the template is a molecular species, but it is possible, steric considerations permitting, that at least some of the template is present as a charge-balancing cation. Generally the template is too large to move freely through the intracrystalline pore system of the formed SAPO and may be removed by a post-treatment process, such as by calcining the SAPO at temperatures of between about 200° C. and to about 700° C. so as to thermally degrade the template or by employing some other post-treatment process for removal of at least part of the template from the SAPO. In some instances the pores of the SAPO are sufficiently large to permit transport of the template, and, accordingly, complete or partial removal thereof can be accomplished by conventional desorption procedures such as carried out in the case of zeolites.

Most any reactive silicon source may be employed herein such that [$SiO_2$] tetrahedra are provided for incorporation in the SAPO framework. In carrying out the instant process the non-zeolitic component may be admixed (blended) or provided sequential to other materials which may provide some property which is beneficial under process conditions, such as improved temperature resistance or improved catalyst life by minimization of coking or which is simply inert under process conditions. Such materials may include synthetic or naturally occurring substances as well as inorganic material such as clays, silicas, aluminas, crystalline aluminosilicate zeolites, metal oxides and mixtures thereof. In addition, the non-zeolitic component may be formed with materials such as silica, alumina, silica-alumina, silica-magnesia, silico-zirconia, silica-thoria, silica-berylia, silica-titania, as well as ternary compositions, such as silica-alumina-thoria, silica-alumina-zirconia and clays present as binders. The relative proportions of the above materials and the non-zeolitic may vary widely with silicoaluminophosphate content ranging between about 1 and about 99 percent by weight of the composite.

The above described non-zeolitic materials, e.g., the $AlPO_4$, silicalite and SAPO compositions, may be used, optionally, in the instant process in combination with active cracking catalysts such as employed heretofore for hydrocarbon cracking processes. It is believed that one of the most surprising aspects of the present process is the ability to use such non-zeolitic components either alone or in combination with zeolites as catalysts for the instant process. The non-zeolitic component may be employed with a group of highly active catalysts by placing it in admixture with the zeolitic component. Zeolitic crystalline aluminosilicates of either natural or synthetic origin having an ordered crystal structure may be employed as the zeolitic cracking component herein. These crystalline zeolitic materials generally have a high surface area per gram and are generally described as microporous. Crystalline zeolites with pore sizes in the range of greater than about 4A° and less than about 10A° are generally employable in conjunction with the non-zeolitic component. Mordenite, ZSM-type crystalline aluminosilicates, LZ-10 and the like may also be employed herein. Further, new zeolitic materials are also believed to be employable as the optional zeolitic component herein such as those zeolites described in copending U.S. Ser. No. 315,853, filed Oct. 28, 1981, incorporated herein by reference thereto. In the process of the present invention it is preferred to use non-zeolitic molecular sieves having a pore size only sufficiently large to afford entry and egress of desired carbon-hydrogen fragmentation compounds and most preferably only sufficiently large enough for methanol.

The non-zeolitic component and, the zeolitic component of the catalyst may be varied within relatively wide limits as to the cation character, concentration as well as to any added component which may be provided to the catalyst by precipitation, adsorption and the like. Important variables in the formulation of such catalysts include the silica-alumina ratio, pore diameter and the spatial arrangement of cations.

The non-zeolitic components and the zeolitic components suitable for use in the present invention may be modified in activity by mixing with a matrix material having significant or only slight or no catalytic activity. It may be one providing a synergistic effect as observed in large molecule cracking with a large pore material which may act as a coke sink. Catalytically active inorganic oxide matrix materials are particularly desired because of their porosity, attrition resistance and stability under the cracking reaction conditions generally encountered in a fluid catalyst cracking operation. Inorganic oxide gels suitable for this purpose are fully disclosed in U.S. Pat. No. 3,140,253 issued July 7, 1964 and such disclosure is incorporated herein by reference.

A catalytically active inorganic oxide may be combined with a raw or natural clay, a calcined clay, or a clay which has been chemically treated with an acid or an alkali medium or both. Typically the matrix material is combined with the catalyst in such proportions that the resulting product contains a from about 1% to about 95% by weight of the catalyst and preferably from about 5% up to about 50 weight percent of the catalyst may be employed in the final composite. The catalyst may also be provided with an effective amount of an effective metal if the process is carried out without significant amounts of hydrogen being present.

The carbon-hydrogen fragmentation compound may be provided to the process in most any way so long as it is present when contact with the catalyst material is effected, i.e. in situ generation is suitable.

The hydrocarbon feeds, i.e. the crude oils which may be processed in the cracking operation of this invention may be any heavy petroleum fraction such as atmospheric gas oil, vacuum gas oil, atmospheric and vacuum resids, synthetic crudes derived from oil shale, tar sands, coal and solvent refined coal. In short, any hydrogen deficient feedstock and preferably one that would require a more conventional high pressure hydrocracking and hydrotreating operation to render the feed suitable for use in a fluid catalytic cracking operation can be used in the method of this invention.

Current practice for upgrading high molecular weight, hydrogen-deficient, high-impurity refinery stocks generally involves either hydrotreating followed by catalytic cracking, or hydrocracking, both of which involve the use of costly gaseous hydrogen at high pressures (i.e. 500–3000 psig), in expensive, high-pressure process units. Alternately some poor quality stocks are catalytically cracked alone with low quality product being produced which requires extensive upgrading or dilution before becoming saleable. Some of these processes often require expensive gas compressors and complex heat transfer or hydrogen-quenching systems. In addition, although those processes improve conversion and product yields, significant losses in gasoline octane are often incurred, requiring a subsequent reforming step to upgrade gasoline quality.

The present process preferably employs a fluidized catalyst system at low pressures. Preferably, the process does not employ added hydrogen gas and is generally substantially free of added hydrogen. Such a system promotes the highly efficient contact of relatively inexpensive carbon-hydrogen fragmentation compounds with heavy, refractory molecules in the presence of high-surface area cracking catalyst. Intermolecular hydrogen-transfer interactions, e.g., methylating reactions, and catalytic cracking reactions are effected in the presence of fluidized catalyst particles and act to minimize problems due to diffusion/mass transport limitations and/or heat transfer.

The present invention can make use of the relatively cheap carbon-hydrogen fragmentation compounds readily available in petroleum refineries, such as light gas fractions, light olefins, low boiling liquid streams, etc. It also makes particular use of methanol, a product which is readily available in quantity, either as a transportable product from overseas natural gas conversion processes, or as a product from large scale coal, shale, or tar sand gasification. It also can utilize carbon monoxide (in combination with contributors such as water or methanol), which gas is readily available from refinery regeneration flue gas (or other incomplete combustion processes), or from coal, shale, or tar sand gasification. Highly efficient recycle of carbon-hydrogen fragmentation compounds can also be effected.

A particularly attractive feature of this invention is concerned with converting a mixed molecular weight crude as the charge with the light end portion thereof constituting at least a part of the carbon-hydrogen fragmentation compound alone or in combination with added methanol or other carbon-hydrogen fragmentation compounds.

The combination reactions comprising this invention are believed to be effective, at least in part, in removing sulfur, oxygen, nitrogen and metal contaminants found in a whole crude or a heavy hydrocarbon portion thereof.

The operation of this invention is generally carried out at temperatures within the range of 400° F. up to about 1400° F. and more usually within the range of 700° F. to about 1200° F. at pressures selected from within the range of below atmospheric up to several hundred pounds but normally less than 100 psig. Preferred conditions include a temperature within the range of about 800° F. to about 1150° F. and pressures within the range of atmospheric to about 200 psig and higher.

In the preferred operation of this invention methanol and/or dimethyl ether is used in combination with a gas oil type of hydrocarbon charge stock. The weight percent of methanol in the hydrocarbon charge passed to the crude oil conversion operation will vary considerably and may be selected from within the range of between about 1% and about 25 percent by weight, it being preferred to maintain the ratio within the range between about 5% and about 20, based on the weight of the feed. However, this may vary depending upon the carbon-hydrogen fragment and/or hydrogen deficiency of the crude oil feed, the amount of sulfur, nitrogen and oxygen in the crude oil feed, the amount of polycyclic aromatics, the type of catalyst employed, and the level of conversion desired. It is preferred to avoid providing any considerable or significant excess of methanol with the crude oil feed because of its tendency to react with itself under some process conditions.

The following examples are provided to illustrate the invention are not intended to be limiting thereof:

EXAMPLES 1–6

The use of a non-zeolitic catalyst comprising one of the following non-zeolitic molecular sieves is evaluated in the instant process:

| Example | Non-Zeolitic Material |
|---|---|
| 1 | SAPO-5 |
| 2 | SAPO-34 |
| 3 | SAPO-11 |
| 4 | SAPO-31 |
| 5 | AlPO$_4$-5 |
| 6 | Silicalite |

The crude oil feed is a heavy vacuum gas oil and is employed in a cracking operation. The vacuum gas oil is characterized by the API gravity (600° F.) of 20.5, an average molecular weight of about 400 and a boiling range between about 700° F. and about 940° F. The carbon-hydrogen fragmentation compound is methanol and is present in an amount of 14 percent by weight. Each catalyst is tested in a riser FCC unit after heating the catalyst to about 1000° F. The products show improved selectivity to motor fuel (hydrocarbon) products by addition of the carbon-hydrogen fragments from methanol as characterized by the presence of hydrocarbon fuels boiling below the boiling range of the crude oil feed.

EXAMPLES 7–12

Examples 1 to 6 are repeated except that the carbon-hydrogen fragmentation compound is dimethyl ether. Results similar to those observed for methanol are observed.

EXAMPLES 13–18

Examples 1 to 6 are repeated except that zeolite Y is admixed with the non-zeolitic molecular sieve in an equal weight. Results similar to those of examples 1 to 6 are observed with catalytic cracking reactions being observed also.

What is claimed is:
1. The process for conversion of a crude oil feed comprising:
(a) combining the crude oil feed with between about 1 weight percent and about 25 weight percent, based on total feed weight, of a carbon-hydrogen fragmentation compound selected from the group consisting of alcohols, acetals, aldehydes, ketones, aliphatic ethers, olefins, napthenes, paraffins containing from about 13.0 to about 25 percent by weight hydrogen and mixtures thereof; and
(b) contacting the combined product of step (a) at effective catalytic cracking conditions with a catalyst comprising at least one non-zeolitic moleoular sieve selected from the group consisting of:
(1) microporous crystalline silicoaluminophosphate having a unit empirical formula in the as-synthesized and anhydrous form of:

wherein "R" represents at least one organic templating agent present in the intracrystalline pore system; "m" has a value of from zero to 0.3: "m" represents the moles of "R" present per mole of $(Si_xAl_yP_z)O_2$; "x", "y" and "z" represent the mole fractions of silicon, aluminum and phosphorus respectively, present as tetrahedral units, said mole fractions being such that they are within the pentaqonal compositional area defined by points A,B,C,D and E of the ternary diagram which is FIG. 1 of the drawings; and (2) aluminophosphates having a framework structure whose chemical composition expressed in terms of mole ratios of oxides is:

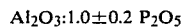

each of said framework structures being microporous in which the pores are uniform and have nominal diameters within the range of about 3 to about 10 Angstroms, an intracrystalline adsorption capacity for water at 4.6 torr and 24° C. of at least 3.5 weight percent, the adsorption and desorption of water being completely reversible while retaining the same essential framework topology in both the hydrated and dehydrated state.

2. The process of claim 1 wherein the silicoaluminophosphate has mole fraction of silicon, aluminum and phosphorus within the pentagonal compositional area defined by points a,b,c,d and e of the ternary diagram which is FIG. 2 of the drawings.

3. The process of claim 1 wherein "m" has a value of from 0.02 to 0.03 for said silicoaluminaphosphates.

4. The process of claim 1 wherein the carbon-hydrogen fragmentation compound is selected from the group consisting of alkanols and dialkyl ethers having from 1 to 5 carbons and olefins having from 2 to 5 carbons.

5. The process of claim 1 wherein the carbon-hydrogen fragmentation compound is present in step (a) in an amount between about 5 and about 20 percent by weight.

6. The process of claim 1 wherein the carbon-hydrogen fragmentation compound is a mixture of methanol and dimethyl ether, each being present in equal weight amounts.

7. The process of claim 1 wherein the non-zeolitic molecular sieve is SAPO–34.

8. The process of claim 1 wherein the catalyst also contains a crystalline zeolitic cracking catalyst selected from the group consisting of ZSM-type zeolites. Y-type zeolites, zeolite X, zeolite LZ-10 and mixtures thereof.

9. The method of claim 8 wherein the crystalline zeolitic cracking catalyst is a ZSM-type zeolite.

10. The process of claim 8 wherein the crystalline zeolitic cracking catalyst is a Y zeolite.

11. The process of claim 8 wherein the crystalline zeolitic cracking catalyst is LZ-210.

12. The process of claim 1 wherein the carbon-hydrogen fragmentation compound is methanol, dimethyl ether or mixtures thereof.

13. The process of claim 12 wherein the carbon-hydrogen fragmentation compound is methanol.

14. The process of claim 12 wherein the carbon-hydrogen fragmentation compound is dimethyl ether.

* * * * *